United States Patent [19]

Moule

[11] 4,294,858
[45] Oct. 13, 1981

[54] SELF-SURFACED MEAT PRODUCT MANUFACTURING METHOD AND APPARATUS

[76] Inventor: Rex E. Moule, 370 Grant Ave., Satellite Beach, Fla. 32937

[21] Appl. No.: 134,605

[22] Filed: Mar. 27, 1980

[51] Int. Cl.³ .............................................. A23B 4/00
[52] U.S. Cl. ............................ 426/241; 219/10.55 M; 426/513; 426/516; 426/243
[58] Field of Search ............... 426/241, 243, 513, 516; 219/10.55 M, 10.55 E

[56] References Cited

U.S. PATENT DOCUMENTS

| | | | |
|---|---|---|---|
| 3,597,228 | 8/1971 | Jeppson et al. | 426/243 |
| 3,700,847 | 10/1972 | Rendek et al. | 426/243 |
| 3,889,013 | 6/1975 | Moule | 426/513 |
| 4,113,890 | 9/1978 | Long | 426/513 |
| 4,129,768 | 12/1978 | Anderson | 219/10.55 M |

FOREIGN PATENT DOCUMENTS 1222208  2/1971  United Kingdom ............... 426/241

*Primary Examiner*—Joseph M. Golian
*Assistant Examiner*—George C. Yeung
*Attorney, Agent, or Firm*—James C. Wray

[57] ABSTRACT

An emulsion is stored in pressure containers and is ultimately forced from one container and then the other to a pump which pumps the emulsion against back pressure of the food product into a long Teflon tube of large diameter. The tube passes through cavities in plural microwave ovens and is cured by microwave energy from two magnetrons in each oven operating at about 2,450 megahertz and 1,000 watts each. The flow rate is controlled by the pump so that the food product remains in the microwave energy field for about 4 to 5 minutes whereupon it is fully cured. The continuously flowing food product in the tube is surrounded by a hot oil heat exchanger which heats the surface to about two to five hundred Fahrenheit, while the product is radially constrained and is under back pressure. The tube passes through a cooling heat exchanger immediately after the heater whereupon the surface is cooled to about 40° Fahrenheit while radially constrained and under pressure, thus forming a smooth self-skin. Initial back pressure is assured by a plug which the food product forces through the tube until the tube is full to provide the autogenic back pressure. The back pressure provided by the resistance to flow of the moving mass and the frictional resistance of the product-tube innerface decreases as the product nears the end of the apparatus. At the end of the apparatus the cooled product is sliced and wrapped or cut in lengths to be sliced elsewhere.

19 Claims, 4 Drawing Figures

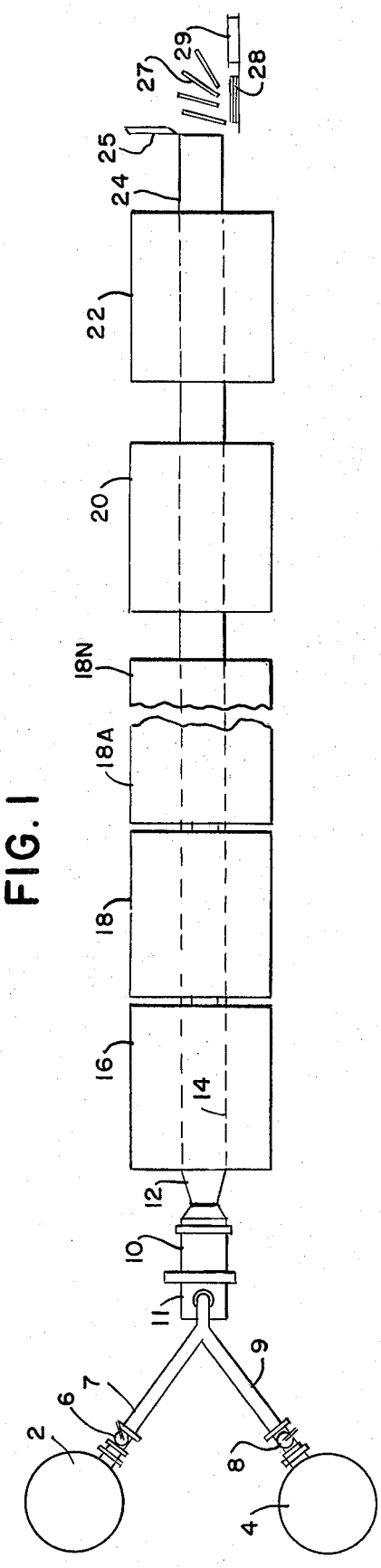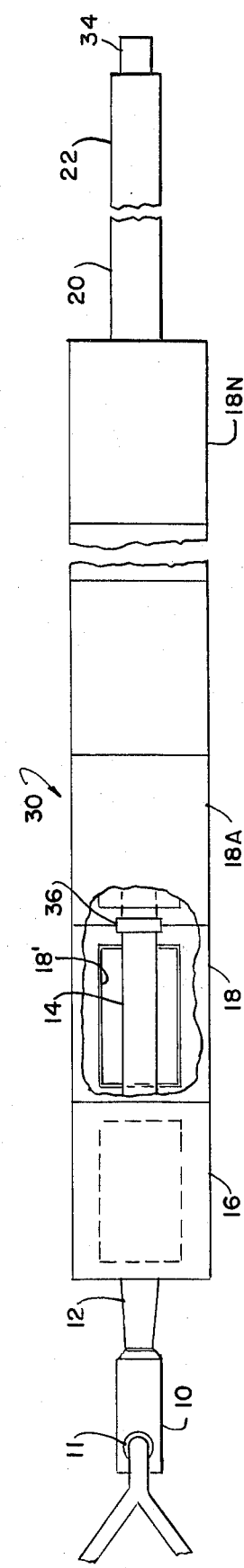

SELF-SURFACED MEAT PRODUCT MANUFACTURING METHOD AND APPARATUS

BACKGROUND OF THE INVENTION

Cured food products made from emulsions and formed in large cylinders or rolls are well known. Examples of such food products are bologna and salami and other similar meat products or meat replacement products.

Heretofore such products have been made by stuffing tubes, either natural or manmade. Upon the completion of manufacturing and curing, in most cases the tubes are removed, usually by a process which destroys the tubes. The products may be marketed with a skin which is a natural gut or with thin polymeric coverings, which must be removed before consumption.

Heretofore it has been difficult to manufacture large cured food products with self skins without the expensive step of providing and removing a tube used in the manufacturing process.

A method of producing skinless food products, notably hot dogs, has been described in U.S. Pat. No. 3,889,013, issued to Rex E. Moule.

SUMMARY OF THE INVENTION

The present invention provides novel methods and apparatus for producing large transverse dimensioned food products from emulsions which require curing and providing on those food products self-skins of high quality without the necessary subsequent steps of destroying and removing production means from the food products.

The food product manufactured according to the present method with the present apparatus can be immediately sliced and packaged in well known commercial packages.

It has been uniquely found that the self-skin may be conveniently formed within an extension of a single tube subsequent to curing the product within that tube.

The method of the present invention for preparing a self-surfaced congealed meat product includes storing a liquefied product in a container, forcing the liquefied product from the container, pumping the liquefied product at a predetermined rate against a back pressure flowing the uncongealed product into a tube, passing microwave energy through the tube and into the product, continuing the flow of the product through the tube and continuing passage of microwave energy through the tube and into the product, thereby congealing the product while the product remains under pressure, heating the tube to an elevated temperature, conducting heat through the tube to outer surfaces of the product thereby forming a self-skin on the product while the product remains under pressure, subsequently cooling the tube and cooling the outer surfaces of the product while the product continually flows through the tube, under pressure, thereby solidifying materials in the outer surfaces of the product and completing the forming of a self-skin, and releasing the product from the tube.

In the method of the present invention, the back pressure is created by laterally constraining the product as it moves through the tube. The back pressure is further provided by autogenic resistance to movement of a mass of the product through the tube. Back pressure is provided by initially placing a plug within the tube and forcing the plug ahead of a mass of product through the tube, until the plug is released from the tube.

The method further includes slicing and packing the product as it is released from the tube or cut in lengths and sliced elsewhere.

Preferably, the product flows through plural microwave ovens, and microwave energy from plural sources passes through the tube and into the product. Typically, the tube is inserted through lateral openings into cavities of laterally juxtaposed microwave ovens.

The heating step is accomplished, for example, under pressure by flowing hot oil through a heat exchanger surrounding the tube. The oil flows in counterflow relationship to the product. The heating further includes flowing oil out of the heat exchanger past a temperature sensor, and into a pump, pumping oil through a heater into the heating exchanger and controlling the heater according to the temperature sensor. The oil is maintained at a temperature in a range from about 200° to about 600° Fahrenheit. Preferably, the oil is maintained at a range of temperatures within 400° to 500° Fahrenheit where the fat particles decrease in size due to heat leaving a cavity. They are refilled with lean or solid food.

While still under pressure, the cooling step includes refrigerating a fluid, circulating the fluid through a heat exchanger surrounding the tube, withdrawing the fluid and recooling the fluid, sensing temperature of the fluid leaving the heat exchanger and controlling flow of the fluid through the heat exchanger according to the sensed temperature. The fluid flows in parallel relationship through the heat exchanger with respect to the product. The cooling step cools the product sufficiently to solidify any fat at the surface.

The tube is from about 2" to about 7" in transverse dimension. Preferably the tube is about 4½" in diameter. The product flows through the tube at a rate sufficient to expose the product to microwave energy at about 2,450 megahertz at 1,000 watts for about four to five minutes so that the product becomes heated in the center to about 155° Fahrenheit and becomes sufficiently cured.

The product in initial form is an emulsion, and the method releases a product which is self-skinned bologna.

The invention provides apparatus for production of a meat product. Containers store a liquefied product. Forcing means force the liquefied product from the containers. Rate control means control flow of product against a back pressure. Tube means receive the product from the rate control means. Microwave energy means surrounding the tube means flow microwave energy through the tube means and into the product. Heating means connected to the tube means sequentially with the microwave energy means heat the surface of the product to a high temperature. Cooling means connected to the tube means sequentially following the heating means cool the surface of the product.

A plug is inserted in the tube for creating back pressure in the tube until the product forces the plug from the releasing end of the tube. This also assures the 4½" tube is full of emulsion.

The microwave energy means comprises plural microwave ovens. Each microwave oven has two magnetrons, each producing microwaves at about 2,500 megahertz and 1000 watts each. The microwave ovens have cavities, and the tube means extend through openings in lateral wall of the microwave ovens which are juxtaposed.

The heating means includes a heat exchanger surrounding the tube means, a pump, an outflow pipe connected to the heat exchanger, an inflow pipe connected to the heat exchanger, vegetable oil disposed in the heat exchanger and in the inflow and outflow pipes and pump, temperature sensing means connected to the outflow pipe and calrod heater means in the inflow pipe and the control means connected to the temperature sensing means and to the calrod heater means for controlling the heater according to sensed temperature.

The cooling means includes a heat exchanger surrounding the tube and refrigeration means connected to the heat exchanger, temperature sensing means connected to an outflow from a heat exchanger and fluid control means connected to an inflow of the heat exchanger and control means connected to the temperature sensing means and to the fluid control means for controlling the fluid control means according to the temperature sensor.

A preferred way to accomplish cooling is to pass the Teflon tubing through the evaporator of a compressor cooling system.

These and further and other objects and features of the invention are apparent in the disclosure. The disclosure comprises the specification, with its appended claims and the drawings.

BRIEF DESCRIPTION OF THE DRAWINGS

FIG. 1 is a schematic view of the apparatus and method steps of the present invention.

FIG. 2 is a detail of the elements shown in FIG. 1.

DETAILED DESCRIPTION OF THE DRAWINGS

Figure 3:
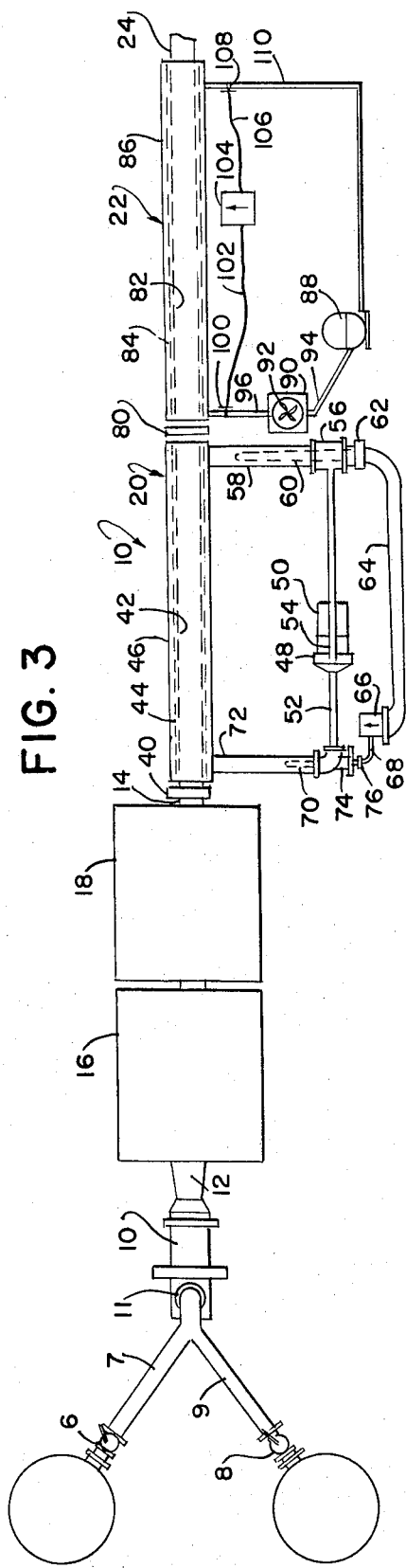
FIG. 3 is a further detail particularly showing heating and cooling elements and steps used in the present invention.

Referring to the drawings an emulsified product is stored in containers 2 and 4, from which the emulsified product is forced through valves 6 and 8 and lines 7 and 9 to the inlet 11 of a Moyno pump 10. The liquefied food product emulsion is then forced by the pump or by air pressure or by weight of the emulsion through expander 12 to the inlet of an elongated tube 14. Microwave ovens 16, 18, 18A ... 18N surround the tube 14. Sequentially mounted along tube 14 are heating means 20 and cooling means 22. The releasing means 24 feeds the product which has been cured and congealed in the microwave means and which has formed thereon a fine surface self-skin by heater 20 and cooler 22 to a slicer schematically represented at 25. A receiver receives the sliced product and delivers the slices 27 to package 28 which is subsequently covered 29 and sealed in well known bologna-type containers.

As shown in the embodiment 30 of FIG. 2, the Teflon tube 14 passes through cavities 18' of a plurality of microwave ovens 16, 18, 18A ... 18N. As an example, ten ovens may be used. The number of ovens used may be varied inversely according to the flow rate so that the product remains in the microwave oven from four to five minutes preferably four and a half minutes to obtain complete curing. The product flows out of the last oven directly to heat exchangers and then to outlet 34. Preferably the tube 14 is a unitary Teflon tube, alternatively connectors 36 may physically secure ends of abutted or lapped tube sections.

In FIG. 3, two microwave ovens 16 and 18 are provided. Teflon tube 14 extends through the microwave ovens and is connected via connector 40 to Teflon tube 42 within jacket 44 which is spaced from the outer wall 46 of the heat exchanger. Hot vegetable oil fills the heat exchanger and surrounds the copper jacket 44. Electric motor 50 drives pump 48 to pump the hot oil from intake 52 to outlet 54. Coupling tee 56 connects the pump outlet 54 to inlet pipe 58 which contains a calrod 60 mounted on coupling 62. Wires 64 connect the calrod to a controller 66, which is also connected via wires 68 to temperature sensor 70 on mounting 76 which is connected to coupling tee 74 to sense the temperature in the heat exchanger outflow line 72. The temperature control 66 controls current supplied to the calrod 60 to maintain the heater 20 at the desired temperature—preferably between 250° to 500° Fahrenheit. Coupling device 80 connects Teflon tube 42 to Teflon tube length 82 which is supplied with a copper jacket 84 inside heat exchanger tube 86. Compressor 88 supplies Freon to outlet 94 and then to condenser coils 90 which are cooled by fan 92. Expansion valve 100 connected by wires 102 to control 104 controls the flow of coolant to heat exchanger 86 according to temperature sensed in sensor 108 and communicated through wires 106 to the controller 104. Accordingly temperature in the outflow 110 controls the volume of fluid released from line 96 to the heat exchanger to provide the cooling in cooler 22. Outlet 24 releases the finished food product whose surface has been chilled to about 20° to 40° Fahrenheit.

Figure 4:
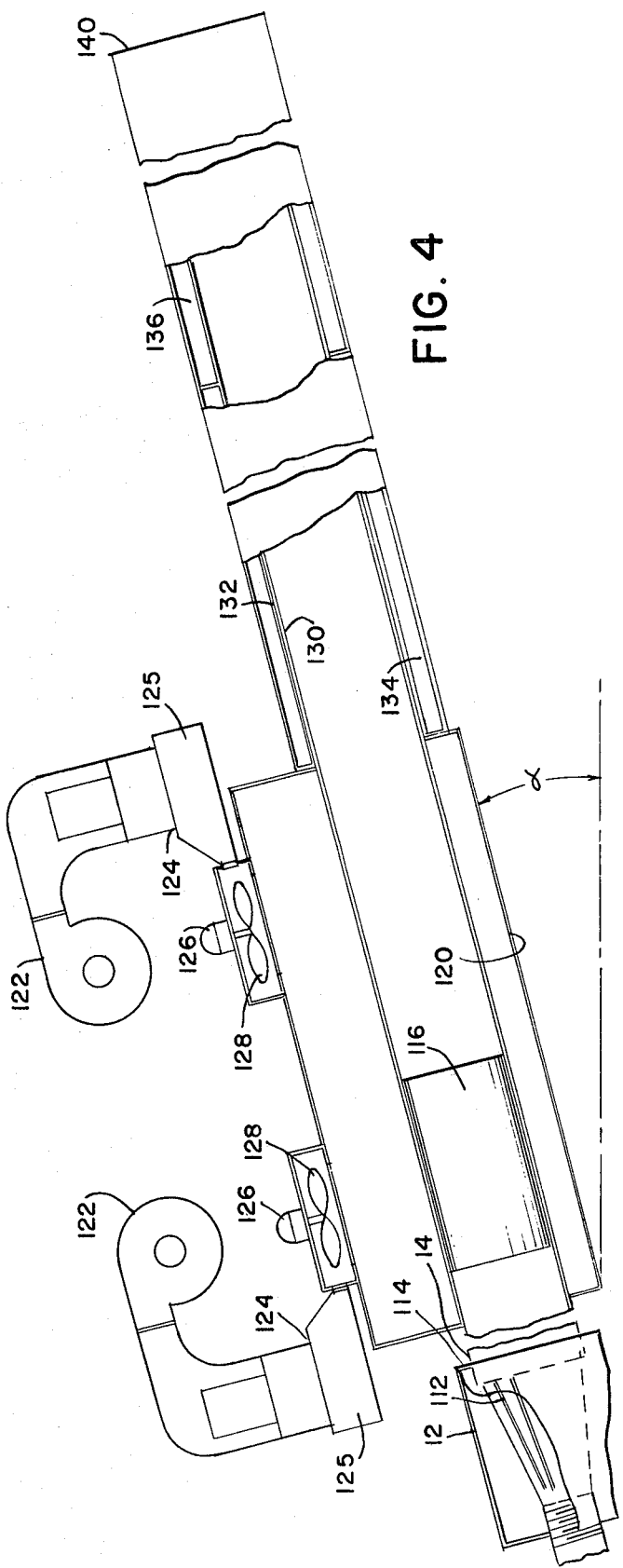
FIG. 4 is a detail of an example of one microwave oven used in the present invention.

As shown in FIG. 4, the expander has divergent fins 112 and is connected to Teflon tube 14 by a coupler 114. A plug 116, which has a length at least greater than its diameter, is initially inserted in the tube to insure that the emulsion fills tube 14 and to provide back pressure until the entire length of tube is filled with product. One or more microwave ovens—in this case schematically represented by a single microwave oven 120—surround tube 14. Each microwave oven is provided with dual magnetrons 124 equipped with blowers 122 and wave guides 125 which direct the microwave energy to slowly rotating reflector blades 128 driven by electric motors 126.

In the usual practice, each magnetron has an output of 2,450 megahertz and 1,000 watts. The microwaves are reflected from the reflector blades to all reflective surfaces of the microwave cavity and pass through the tube and the product moving therethrough during the period of time the product is within the microwave cavities. The flow rate of the product is controlled so that the product is completely congealed and cured by heating to a temperature of at least 100° Fahrenheit before the product passes out of the microwave energy means. The product then passes through the portion 130 of the Teflon tube which is covered by a jacket 132 within heat exchanger 134. The product continues directly from the heating means 134 to cooling means 136 preferably within a unitary Teflon tube on which jackets have been secured.

In an example of the use of the present invention, bologna is manufactured in a Teflon tube of four and one-half inch diameter. The bologna is fully cured as it is released from the machine. The bologna is sliced upon its release from the extruder machine of the present invention or the bologna product is cut into suitable lengths as required to be sliced later.

The four and one-half inch diameter emulsion is heated throughout to coagulate it evenly at the required temperature. The surface is finished smoothly.

The emulsion is subjected to microwave energy while it is extruded under pressure and is radially constrained in a dialetric tube. The extruding and the length of the tube and the resistance against the extrusion provided by the mass of extruded material and its surface friction with the tube create the desired pressure or pressures under which the product is coagulated and cured, and surface heated and cooled. The pressures decrease as the product moves along the tube.

As shown in FIG. 4 to increase the back pressures the tube 14 may be elevated at angle alpha, for example about fifteen degrees, or the product may be extruded through a vertical tube if the consistency of the product requires higher pressures for better surface finish.

In one example of the invention, an emulsion becomes heated in the center to about 140° Fahrenheit in four to five minutes when subjected to 2,450 megahertz and 1,000 watts. At those values, coagulation and curing of the product is completed under pressure and then the product is subjected to surface heating and cooling under pressure to result in a smooth outer self-skin finish.

A Moyno pump is fed emulsion from one or more pressure tanks. Emulsion may be forced from one pressure tank while another pressure tank is being filled.

The adjustable R.P.M. of the Moyno pump meters the amount of emulsions applied to the four and one-half inch internal diameter Teflon tube. The Teflon tube runs through two or more microwave ovens, which for example may be seven-ten Litton microwave ovens, each having two 1,000 watt magnetrons delivering electromagnetic waves at a frequency of 2,450 megahertz.

These waves pass through the diaelectric Teflon tube and enter the emulsion. The high frequency oscillation of food molecules is then believed to heat the molecules throughout the emulsion to the necessary curing and coagulation temperature, which may be considered to be about 140° Fahrenheit, for example.

From the microwave ovens the Teflon tubing enters a surface heater which is supplied with hot vegetable oil in the range of about 250° to 500° Fahrenheit, preferably about 400° to 500° Fahrenheit. Fat particles on the surface of the product melt and cavities are filled under pressure with solid food. Still under pressure and radially constrained, the emulsion moves through the Teflon tubing passing through a surface cooler which solidifies the small amounts of fat left on the surface.

Factors that determine the speed of a production machine are the length and number of microwave ovens and magnetrons used.

In one example a series of seven-ten Litton microwave ovens are used. Each oven has two 1,000 watt magnetrons, and each magnetron is capable of heating a four and one-half inch diameter mass to 140° Fahrenheit in four to five minutes. Each oven added to the line decreases the cooking time and enables the emulsion to be speeded through the tube. For example, the emulsion should pass through ten similar ovens in four minutes to provide the same cure and coagulation. The temperature and lengths of the surface heater and cooler may be adjusted to compensate for the flow rate of the hot product through the tube.

In an embodiment of the invention wherein the product is retained within the microwave ovens sufficiently to melt surface fat particles so that the cavities formed by the melting of those particles may be refilled with solid meat under pressure, the surface heater may be eliminated, and the Teflon tube may be run directly through a surface cooler at the exit of the last microwave oven.

The system may be provided with reflective shielding and baffles as necessary to insure that no microwave energy reaches operating personnel.

While the invention has been described with reference to specific embodiments, it will be obvious to those skilled in the art that modifications and variations of the invention may be made without departing from the scope of the invention. The scope of the invention is described in the following claims.

I claim:

1. The method for preparing a self-surfaced congealed meat product comprising storing emulsified product in a container, forcing the emulsified product from the container, forcing the emulsified product through a tube at a predetermined rate against a back pressure, wherein back pressure is created by laterally constraining the product as it moves through the tube, passing microwave energy through the tube and into the product, continuing forcing of the product through the tube and continuing passage of microwave energy through the tube and into the product, thereby congealing the product while the product remains under pressure, heating the tube to temperature sufficient to melt materials on the outer surfaces of the product, conducting heat through the tube to outer surfaces of the product thereby forming a self-skin on the product while the product remains under pressure, subsequently cooling the tube and cooling the outer surfaces of the product while the product continually passes through the tube, thereby solidifying materials in the outer surfaces of the product and completing the forming of a self-skin, and releasing the product from the tube.

2. The method of claim 1 wherein the back pressure is further provided by autogenic resistance to movement of a mass of the product through the tube.

3. The method of claim 1 further comprising initially placing a plug within the tube and wherein the back pressure is provided by forcing the plug ahead of a mass of product through the tube, until the plug is released from the tube.

4. The method of claim 1 further comprising slicing and packing the product as it is released from the tube.

5. The method of claim 1 wherein the step of forcing the product through the tube comprises forcing the product through plural microwave ovens and the step of passing microwave energy comprises passing microwave energy from plural sources through the tube and into the product.

6. The method of claim 5 wherein the step of forcing the product through the tube includes forcing the product through a tube inserted through lateral openings into cavities of laterally juxtaposed microwave ovens.

7. The method of claim 1 wherein the heating step comprises circulating hot oil through a heat exchanger surrounding the tube.

8. The method of claim 7 wherein the heating step further comprises circulating oil out of the heat exchanger past a temperature sensor, and into a pump, pumping oil through a heater into the heating exchanger and controlling the heater according to the temperature sensor.

9. The method of claim 7 wherein the oil is maintained at a temperature in a range of from about 200° to about 600° Fahrenheit.

10. The method of claim 7 wherein the oil is maintained at a range of temperatures within 200° to 500° Fahrenheit.

11. The method of claim 7 wherein the oil circulates in counterflow relationship to the product.

12. The method of claim 1 wherein the cooling step comprises refrigerating a fluid, circulating the fluid through a heat exchanger surrounding the tube, withdrawing the fluid and recooling the fluid.

13. The method of claim 12 further comprising sensing temperature of the fluid leaving the heat exchanger and controlling flow of the fluid through the heat exchanger according to the sensed temperature.

14. The method of claim 13 wherein the fluid flows in parallel relationship through the heat exchanger with respect to the product.

15. The method of claim 1 wherein the tube is from about 2" to about 7" in transverse dimension.

16. The method of claim 1 wherein the tube is about 4½" in diameter.

17. The method of claim 1 wherein the step of forcing the product through the tube comprises forcing the product through the tube at a rate sufficient to expose the product to microwave energy at about 2,450 megahertz at 1,000 watts for about four to five minutes so that the product becomes heated in the center to about 140° Fahrenheit and becomes sufficiently curred.

18. The method of claim 1 wherein the method releases a product which is self-skinned balogna.

19. The method of claim 18 wherein the cooling step comprises cooling the product sufficiently to solidify any fat at the surface.

* * * * *